United States Patent
Reicks et al.

(10) Patent No.: US 6,168,822 B1
(45) Date of Patent: Jan. 2, 2001

(54) METHOD FOR PRODUCING A BONE-IN HAM STEAK

(75) Inventors: John Alphonse Reicks; Dwight Davidson; Jesse Henley, all of West Point, MS (US)

(73) Assignee: Sara Lee Corporation, Winston-Salem, NC (US)

(*) Notice: Under 35 U.S.C. 154(b), the term of this patent shall be extended for 0 days.

(21) Appl. No.: 09/163,707

(22) Filed: Sep. 30, 1998

(51) Int. Cl.[7] .................................................... A23L 1/314
(52) U.S. Cl. ...................... 426/641; 426/129; 426/315; 426/392; 426/642; 426/645; 426/647
(58) Field of Search ................................ 426/641, 642, 426/644, 645, 646, 647, 129, 392, 315

(56) References Cited

U.S. PATENT DOCUMENTS 3,363,395 * 1/1968 King ........................................ 426/129
4,303,452 * 12/1981 Ohira et al. ............................ 426/314
4,378,379 * 3/1983 Liesaus .................................. 426/272
4,948,610 * 8/1990 Goglio ................................... 426/392
5,344,660 * 9/1994 Stevison et al. ...................... 426/104

* cited by examiner

Primary Examiner—Gabrielle Brouillette
Assistant Examiner—Hao Mai
(74) Attorney, Agent, or Firm—Kilpatrick Stockton LLP

(57) ABSTRACT

A process for producing a bone-in ham steak made by separating the muscle, fat, and femur bone from a green ham, processing the muscle and fat to form an aggregation of cured muscle, fat, and bone and cooking the aggregate under vacuum. The cooked meat product is chilled, removed from the film package, and, thereafter, smoked to a golden color. It is then sliced transversely into a plurality of bone-in ham steaks having uniform sizes, shapes, and weights.

3 Claims, 3 Drawing Sheets

METHOD FOR PRODUCING A BONE-IN HAM STEAK

BACKGROUND OF THE INVENTION

The present invention relates generally to a process for preparing meat products and, more particularly, to preparing a steak product typically made of ham having a bone placed in the center of the steak. More particularly, it is directed to a method for manufacturing such a product to simulate a natural product.

Bone-in steaks are a popular consumer food item and are served by many restaurants because of economy, efficiency, and ease of preparation. They are much preferred over the traditional way of preparing bone-in steaks wherein the center of a cured bone-in or semi-boneless ham is cut out and served. There are disadvantages in preparing and serving the product in this manner since there can be waste in the remaining portion of the steak because there is an insufficient amount of meat remaining to form additional servings of conventional size and configuration.

To meet the demand for an improved method of producing smaller sized but conventionally configured steaks, a process has been developed that includes separating the femur bone from a green bone-in ham and then processing the ham muscle in a conventional manner. A femur bone is then repositioned in the muscle, and the formed food product is then stuffed into a fibrous casing, cooked and smoked producing a uniformly shaped and sized ham product with a centered bone. It is then sliced into a bone-like ham steak portion of a consistent thickness, weight, and appearance.

This process has been an effective way of providing popularly sized and configured steaks for restaurants and the like, however, stuffing the product into fibrous casings before cooking is not entirely effective in removing air holes and voids in the product and binding the bone to the muscle and achieving a true whole muscle appearance. It is to this deficiency that the present invention is directed.

SUMMARY OF THE INVENTION

The bone-in ham steak of the present invention is produced by separating the femur bone from a green bone-in ham and then processing the whole ham muscles in a conventional manner. The center segments of the femur bones are cut into shorter, more uniform lengths, and the lengths are then aligned and placed on the top of the bottom or outside ham muscle. Additional processed ham muscle is then positioned over the aligned bone segments, and the entire composite product is positioned in a hermetically sealed cook-in bag on a cook-in packaging machine. Approximately 0.5 percent lean meat is left on the femur bone to enhance bone adhesion to the ham muscle. The encased combination of bone and ham muscle is then cooked and smoked, producing a uniformly shaped and sized ham product with a centered bone. It is then sliced into bone-in ham steak portions of consistent thickness, weight, and appearance.

From the foregoing brief summary of the invention, it can be seen that a primary objective of the present invention is to provide a method for forming a ham steak with a uniformly centered bone and a true whole muscle appearance.

A further objective of the present invention is to provide a method to manufacture bone-in ham steaks in controlled portion sizes.

Yet another objective of the present invention is to provide a method of manufacturing a ham steak in which the center, shank, and butt portions of the ham can be used.

Yet still a further objective of the present invention is to provide a method of manufacturing a bone-in ham steak wherein some muscle is left on the bone to improve bone adhesion to the ham muscle and the bone is cured to further encourage bone adhesion to ham muscles.

Yet still a further objective of the present invention is to provide a method of manufacturing bone-in ham steaks that have a whole muscle appearance.

Yet still another further objective of the present invention is to provide a bone-in ham steak which is cooked and chilled in a form, fill, and seal packaging machine, is thereafter removed from the package, and thereafter cold smoked and chilled.

Thus, there has been outlined in summary form the more important features of the invention in order that the detailed description that follows may be better understood and in order that the present contribution to the art may be better appreciated. There are, obviously, additional features of the invention that will be described hereinafter and which will form the subject matter of the claims appended hereto. It is to be understood that the invention is not limited in its application to the details of construction and to the arrangement of the components set forth in the following description illustrated in the drawings. The invention is capable of other embodiments and of being practiced and carried out in various ways.

It is also to be understood that the phraseology and terminology herein are for the purpose of description and should not be regarded as limiting in any respect. Those skilled in the art will appreciate the concept upon which this disclosure is based and that it may readily be utilized as a basis for designing other structures, methods, and systems for carrying out the several purposes of the invention. It is also to be understood that the abstract is neither intended to define the invention or the application which is measured by the claims nor to limit its scope in any way.

This summary and these objectives of the invention, along with the various features of novelty which characterize the invention, are pointed out with particularity in the claims annexed to and forming a part of this disclosure. For better understanding of the invention, its operating advantages, and the specific objectives obtained by its use, reference should be made to the accompanying drawings and descriptive matter in which like characters of reference designate like parts throughout the several views.

BRIEF DESCRIPTION OF THE DRAWINGS

In the description of the present invention, reference will be made to the attached drawings wherein.

DETAILED DESCRIPTION OF THE PREFERRED EMBODIMENT

Figure 1:
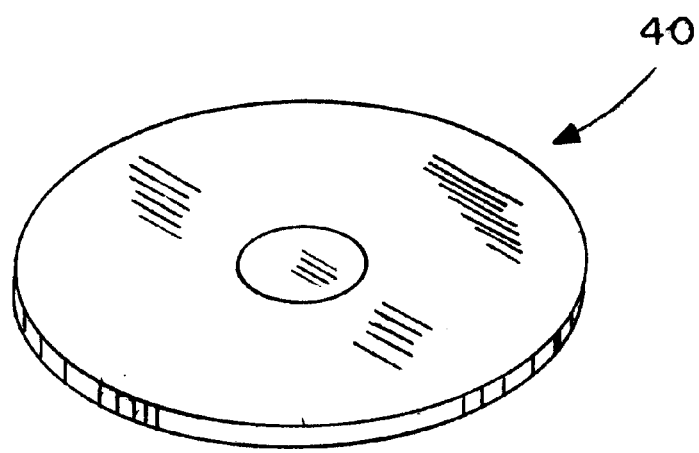
FIG. 1 is a perspective view of a bone-in ham steak produced by the process of the present invention.
Figure 2:
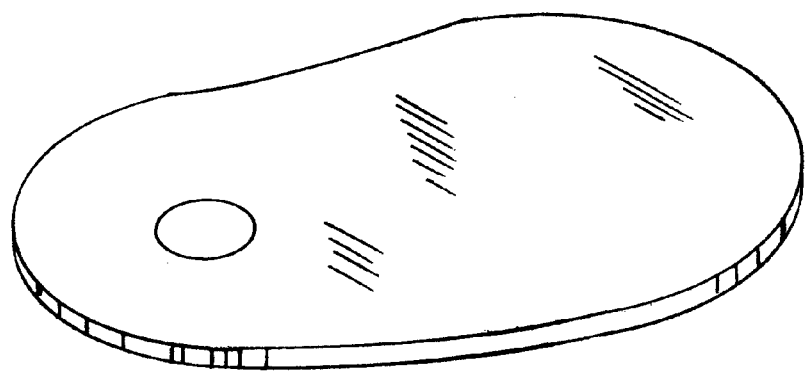
FIG. 2 is a perspective view of a typical prior art natural bone-in, center-cut ham steak.
Figure 3:
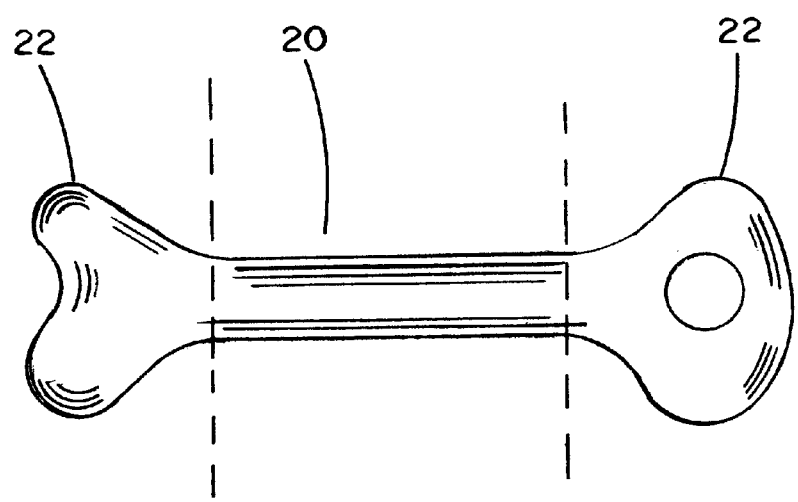
FIG. 3 is a side elevational view of the femur bone used in the process of the present invention before cutting.
Figure 4:
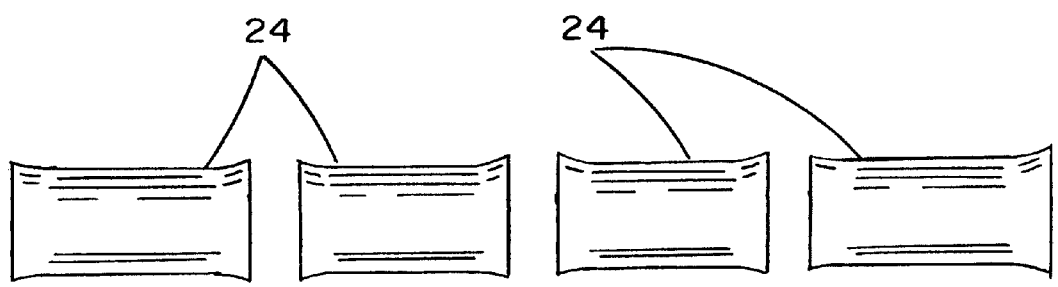
FIG. 4 is a side elevational view of four femur bone segments utilized in the process of the present invention.
Figure 5:
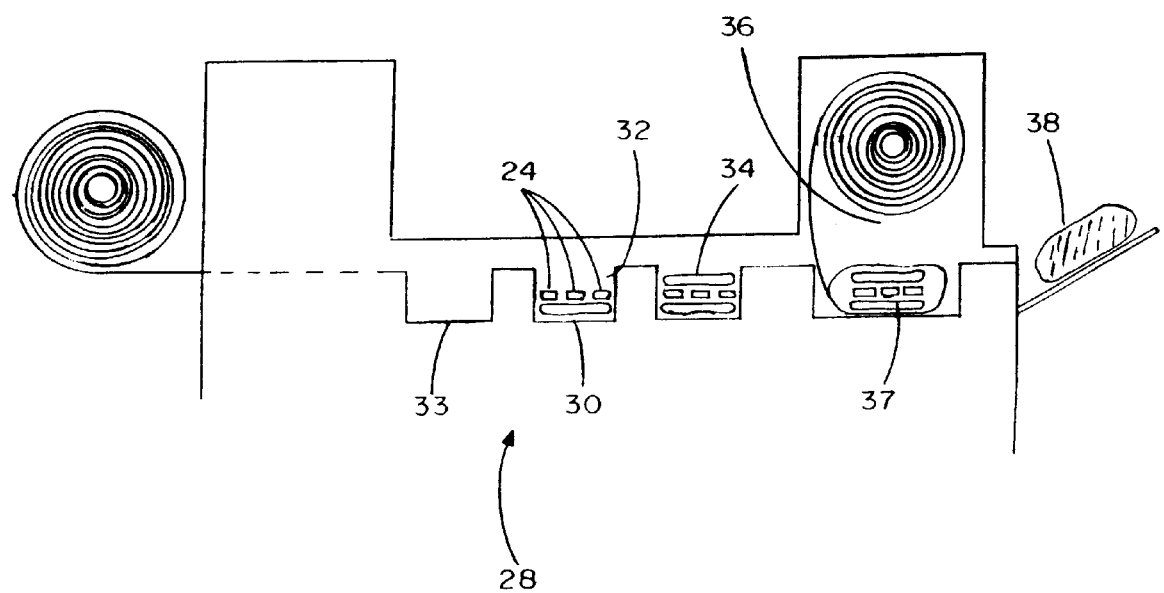
FIG. 5 is a schematic diagram of the form/fill/seal machine utilized to practice the process of the present invention; and, FIG. 6 is a perspective view of the cured and smoked bone-in ham product of the present invention after cooking and before slicing.

The present invention includes boning a ham to remove the outside muscle or bottom with the eye round and inner shank attached. The inside surface area of the muscle is membrane skinned to remove fat and membrane, and the external fat cover is 3/16 inch maximum fat cover. The knuckle/cushions are denuded to a 96 percent fat free condition. The muscles used in the manufacture of the bone-in ham steak are the bottom with knuckles used as fill. They are injected with a specific pickle, tenderized, and tumbled much like a regular boneless ham products.

The femur or middle bone 20 is removed leaving approximately 5 percent meat on the bone to assist in binding. The bones 20 are cured in cover pickle for 16 to 24 hours. The joints 22 are then removed with a band saw so that the remainder 24 of bone 20 is consistent and 100 percent usable for a first quality product. In this condition, it has a center piece appearance from end to end.

At the stuffing line shown generally as 28, the muscles 30 and bone 24 are brought together at the cook-in line stuffing machine 32, and muscles 30 and aligned bones 24 are placed in the cavity 33 fat down with the inner shank 24 on one end. Bones 24 (3 preferably) are placed length-wise across the middle of muscle 30 and the second bottom 34 is placed over bones 24 with the lean side down. The top and ends of cavity 33 are-then filled with denuded, cured, tenderized, and tumbled knuckle or cushion to form the meat product 37. Product 37 is then cycled through the cook-in packaging machine 36, vacuumized and hermetically sealed. The sealed package 38 is thereafter cooked in a smokehouse to an internal temperature of from 155 to 160 degrees Fahrenheit.

After cooking, product 37 is chilled down to approximately 40 degrees Fahrenheit and stripped of the cook-in film. It is then cold smoked in a smokehouse from 4 to 6 hours until the color is golden brown.

After the cold smoke, product 37 is then quick frozen in order to assist in the band saw cutting operation where it is sliced into ham steaks 40 that are exact in weight for preferable portion sizes. For example, every steak 40 is an 8 ounce ham steak with a center slice appearance.

The product thus produced is sold as a ham steak with its most unique trait being that it provides the ability to sell a bone-in ham steak as an exact weight portion rather than a part of a large ham which has to be sized from a larger piece and thereby creates waste. The portion size., are very popular in restaurants and institutional eating facilities.

A long standing problem associated with making a bone-in meat product includes removal and then re-insertion of the bone in a manner that maintains adequate adhesion between the bone segment and meat section during preparation and upon service to a customer. That problem has been addressed in the present invention in that 0.5 percent meat is left on the bone to enhance adhesion. The meat-coated bone is thereafter treated in a solution to further encourage adhesion. Such treatment results in additional adhesion of the bone piece to the meat section after the product has been heated on the grill.

Although the embodiment of the invention described herein is directed specifically at a bone-in ham steak, it can also be adapted for use with other muscle, fat, and bone butchered from a different part of the hog, or from beef cattle or other animals known for providing consumer meat products.

While there have been described particular embodiments of the present invention of a new and useful bone-in meat product and method for making same, it is not intended that such references be construed as limitations upon the scope of the invention, except as set forth in the following claims. While the invention has been described having certain dimensions and other parameters in the preferred embodiment, it is not intended that such dimensions be construed as limitations upon the scope of the invention, except as set forth in the following claims.

What is claimed is:

1. A method for making a bone-in ham steak comprising the steps of:

separating meat and fat from a green ham;

processing the muscle and fat to form an aggregation of cured muscle and fat from which protein has been extracted;

positioning a portion of the aggregation of cured muscle and fat on a first film layer;

placing a linear section of femur bone having a small unremoved meat residue on the aggregation portion of cured muscle and fat;

positioning the balance of the aggregation of cured muscle and fat over the femur bone section and contiguous with the aggregation portion of cured muscle and fat;

positioning a second film layer over the cured muscle and fat and the femur bone section;

sealing the first and second film sheets together;

precooking the sealed aggregation of cured muscle and fat and femur bone under vacuum;

smoke cooking the sealed aggregation of cured muscle and fat and femur bone;

chilling the cooked and sealed aggregation of cured muscle and fat and femur bone;

removing the chilled aggregation of cured muscle and fat and femur bone from the sealed film sheet;

cold smoking and chilling the aggregation of cured muscle and fat and femur bone;

slicing the aggregation of cured muscle and fat and femur bone into a plurality of bone-in ham steaks having a uniform size, shape, and weight and whole muscle appearance; wherein the smoke cooked, sealed aggregation of cured muscle and fat and femur bone is chilled to a temperature of approximately 40° Fahrenheit and the smoke cooked aggregation is cold smoked from four to six hours.

2. The method of claim 1 further comprising the steps of cutting the knee and hip ends from the femur bone leaving a bone segment; and, aligning the plurality of bone segments length-wise to form a linear bone section.

3. The method of claim 1 wherein the femur bone is cured to further improve bone adhesion to the aggregation of cured muscle and fat.

* * * * *